Oct. 29, 1935.  F. SCHÜRMANN  2,019,273
SEALING STRIP FOR WATERLESS GAS HOLDERS
Filed Dec. 27, 1932
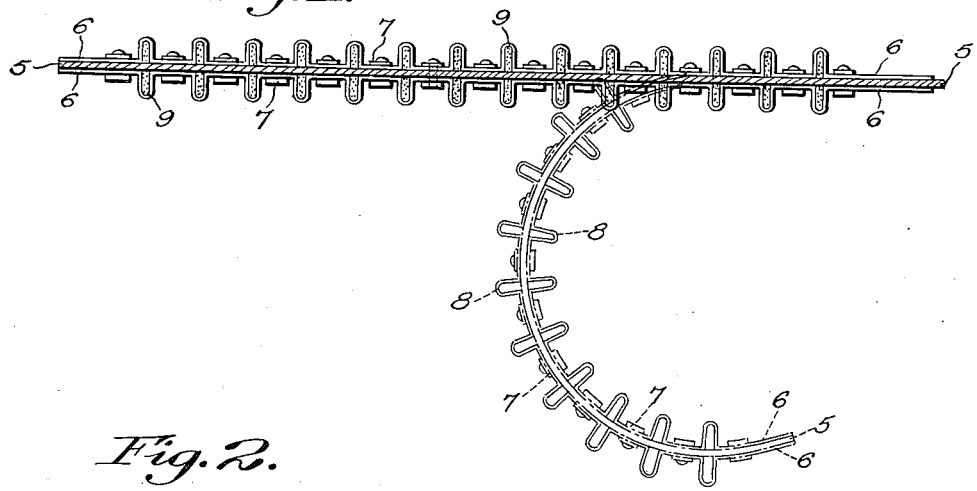
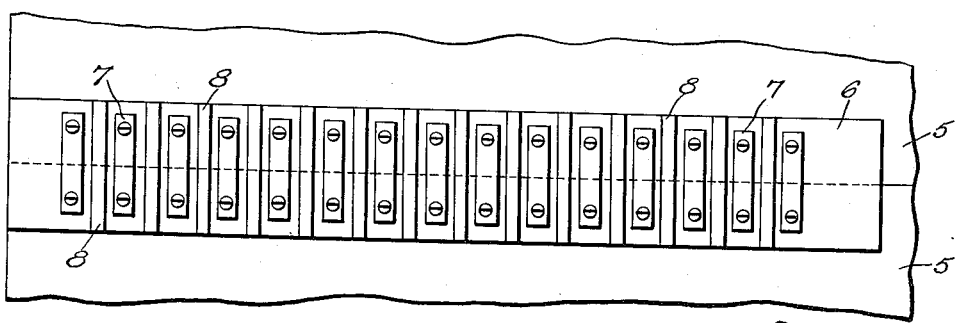
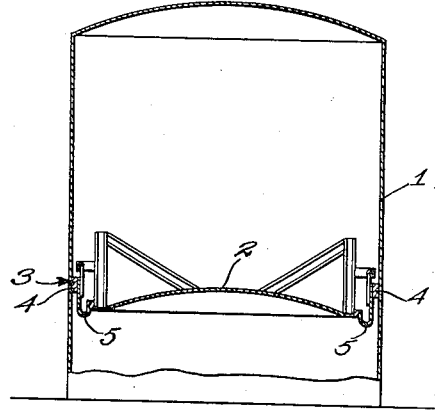
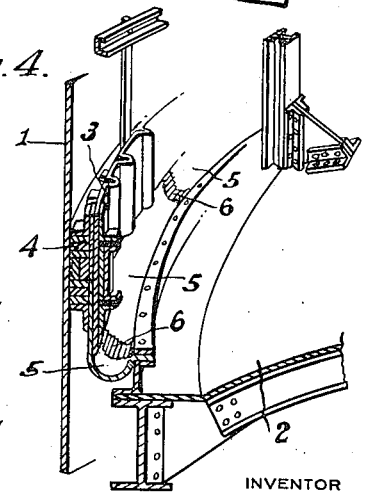
INVENTOR
Frederich Schürmann
BY Wood & Wood,
ATTORNEYS Patented Oct. 29, 1935

2,019,273

UNITED STATES PATENT OFFICE 2,019,273

SEALING STRIP FOR WATERLESS GAS HOLDERS

Friedrich Schürmann, Dortmund, Germany, assignor to The Stacey Bros. Gas Construction Company, Cincinnati, Ohio, a corporation of Ohio Application December 27, 1932, Serial No. 648,873
In Germany December 28, 1931

5 Claims. (Cl. 48—174)

This invention relates to improvements in waterless gas holders of a type employing a shell, usually cylindrical, with a closure, as a piston movable within the shell. An expansible or dilatable ring surrounds the piston and carries a packing pressed against the inner wall surface of the shell. The expandible dilatable packing carrying ring is connected to the outer edge of the said piston structure by a sealing strip of a fabric-like sheet material providing a flexible and bendable connection between the piston and packing ring, permitting the packing ring to expand and contract and to follow the exact contour of the holder or shell no matter what shape it assumes. The sealing strip is formed or assembled in sheets or sections and the present invention is directed to the structure of the joints connecting adjoining sections thereof.

An object of the invention is to provide a sealing strip as a flexible joint connecting a packing ring and piston of a waterless gas holder, the sealing strip as an endless band composed of a plurality of sheet-like sections with the sections joined in a simple and secure manner, reinforcing the strip and providing bendable and impervious joints.

Another object of the invention is to provide a sealing strip of pliable or bendable material as an endless band forming a flexible joint connecting the packing ring and piston of the waterless gas holder, the band composed of sections joined together at opposite sides by metallic cleat strips longitudinally of the joint and overlapping the joining ends of the sections and the parts secured together by bolts passing through the cleats and sections.

Various other features and advantages of the improvement will be more fully described in the description of the accompanying drawing in which:

Figure 1 shows a cross section of the joint longitudinally of the meeting or joined ends of the sections.

Figure 2 is a plan view thereof.

Figure 3 is a diagrammatic sectional view of a waterless gas holder disclosing the sealing strip connecting the packing supporting ring and piston to which the invention is directed.

Figure 4 is an enlarged detail section illustrating a portion of the holder or shell, a portion of the closure piston movable within the shell suspendingly sustaining a sealing ring or packing engaged against the inner surface of the shell, and a sealing strip connecting the packing and piston composed of adjoining sections connected together in the manner shown in Figures 1 and 2.

In waterless gas holders the expansible sealing ring which carries the packing which is pressed against the shell of the holder is usually connected with the piston by means of an adjustable and flexible sealing strip of elastic or rubber gas impervious material. This sealing strip is assembled in sections and the joints between the sections are made with bolts and metal flaps. The assembly of the sections of this flexible sealing strip is made while the sealing strip is straight or flat, after which the strip is bent into its final form such as, for instance, a half circle. Inasmuch as this adjustable sealing strip is subjected to considerable irregularities, when the sealing strip is bent from the straight line there are irregularities and elongations in the spaces between the sections of sealing strips which have to be taken up by some kind of a metal flap.

The outer flaps have a tendency to stretch or expand, while at the inner edge where compression is set up, there appears to be deformation.

Referring to the drawing, 1 indicates the holder or shell, 2, a closure piston movable within the shell. The piston is surrounded by an expansible or dilatable sealing ring 3 which carries a packing 4 bearing against the inner wall surface of the shell. The sealing ring is preferably suspendingly sustained from a frame work on the upper side of the piston and a closure or sealing strip as a flexible connection connects at one end with the sealing ring or packing and at the opposite end with the piston, the sealing strip normally assuming a bend to accommodate for the lateral movement of the piston and to permit the packing to follow the exact contour of the shell for maintaining a tight seal.

The sealing strip is composed of a plurality of sections with each pair of adjoining sections 5—5 joined together by metallic cleat strips 6—6, one for each of the opposite sides of the sections. The cleat strips extend longitudinally of the joint with the ends of the sections preferably abuttingly engaged and the cleat strips overlapping the ends of a pair of adjoining sections. A pair of cleat strips is provided for each joint, one for each of the opposite sides of the sections and the parts are bolted together, the bolts engaged through the strips and sections and through rigid clamp plates 7 at definite spacing apart and in relative registry for opposite sides of the joint. The cleat strips preferably are transversely corrugated or fluted, the corrugations or flutes 8 being at predetermined uniform spacing apart and extend outwardly with the clamp plates each disposed intermediate of a pair of flutes. The parts are assembled while the sections are straight or flat, and to obtain a good tight sealing, the hollow spaces 9 formed by the flutes are packed or filled with some elastic material such as rubber, jute, or saturated lamp wick.

After the sections are united the sealing strip is bent to the proper curvature for connecting the sealing ring and piston. The metallic cleat strips provide a reinforcement for the sealing strip, and the flutes compensate for the bending of the joint without strain or pull upon the bolts which might have a tendency to destroy the seal. The joint readily accommodates for the required bending or deformation of the sealing strip as may be necessary in the relative movements of a sealing ring and piston for maintaining the packing ring in contact with the inner surface of the shell or holder.

Having described my invention, I claim:

1. A sealing strip for making a flexible joint between a sealing ring and piston of a waterless gas holder, the strip composed of sections, and metallic cleats uniting adjoining sections extending longitudinally of the joining ends of the sections and for both sides thereof.

2. A sealing strip for making a flexible joint between a sealing ring and piston of a waterless gas holder, the strip composed of sections, metallic cleats uniting adjoining sections extending longitudinally of the joining ends of the sections and for both sides thereof, the cleat strips transversely fluted, and means for securing the parts together, said means passing through the cleat strips and sections between the flutes.

3. A sealing strip for making a flexible joint between a sealing ring and piston of a waterless gas holder, the strip composed of sections, and transversely fluted metallic cleats uniting adjoining sections extending longitudinally of the joining ends of the sections and for both sides thereof, the flutes for the opposite sides of the sections being in relative registry, and extending in opposing directions.

4. A sealing strip for making a flexible joint between a sealing ring and piston of a waterless gas holder, the strip composed of sections, metallic cleats uniting adjoining sections extending longitudinally of the joining ends of the sections and for both sides thereof, the cleat strips being transversely fluted, clamp plates between the flutes at the outer sides of the cleat strips, and bolts passing through the clamp plates, cleat strips, and sections for securing the parts together.

5. A sealing strip for making a flexible joint between a sealing ring and piston of a waterless gas holder, the strip composed of sections, and transversely fluted metallic cleats uniting adjoining sections extending longitudinally of the joining ends of the sections and for both sides thereof, the flutes for the opposite sides of the sections being in relative registry, and extending in opposing directions, and a sealing medium packed into the flutes.

FRIEDRICH SCHÜRMANN.